United States Patent

[11] 3,550,715

[72] Inventor Donald L. Johnson
Kenosha, Wis.
[21] Appl. No. 754,647
[22] Filed Aug. 22, 1968
[45] Patented Dec. 29, 1970
[73] Assignee J. I. Case Company
Racine, Wis.
a corporation of Wisconsin

[54] CONTROL CONSOLE FOR VEHICLE
4 Claims, 3 Drawing Figs.
[52] U.S. Cl. .................................................. 180/90,
296/70; 180/1
[51] Int. Cl. ............................................. B60k 37/06
[50] Field of Search .......................................... 180/77,
77S, 89, 90; 296/70

[56] References Cited
UNITED STATES PATENTS
2,091,059 8/1937 Tjaarda ........................ 180/90

| 2,625,285 | 1/1953 | Weaver ........................ | 180/77UX |
| 2,876,857 | 5/1958 | Beyerstedt .................... | 180/90 |
| 3,194,338 | 7/1965 | Rutman et al. ................ | 180/90 |
| 3,223,193 | 12/1965 | Reynolds et al. ............. | 180/77(S) |
| 3,362,247 | 1/1968 | Watts ............................ | 180/77X |

Primary Examiner—A. Harry Levy
Attorney—Settle, Batchelder & Oltman

ABSTRACT: A control console located adjacent one side of an operator's compartment of a vehicle having a seat located thereon. The console houses a plurality of groups of control levers and has an upper surface inclined with respect to the horizontal plane of the vehicle to be perpendicular to the line of sight of an operator in the seat. Each group of levers has free ends which are located in a plane extending upwardly and away from the seat so that only one control lever of each group will be contacted by an operator moving his hand along a horizontal plane.

PATENTED DEC 29 1970 3,550,715
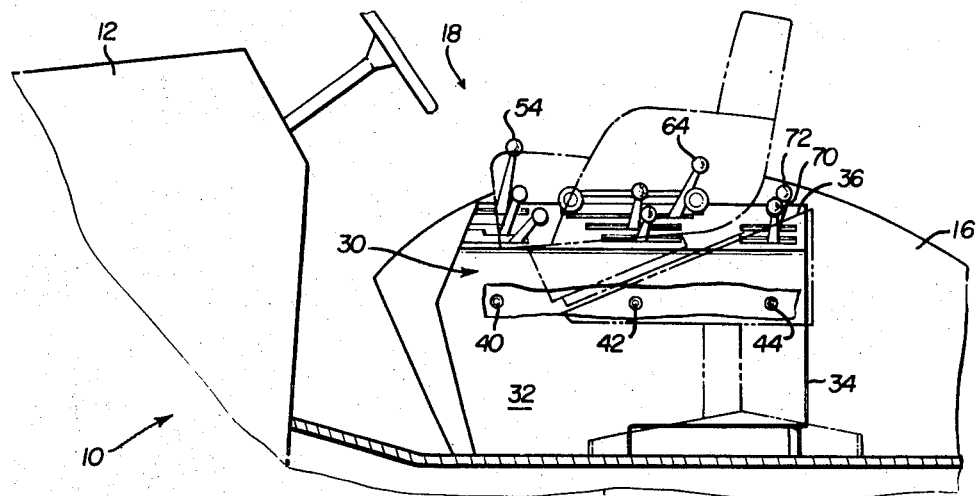
FIG. 3
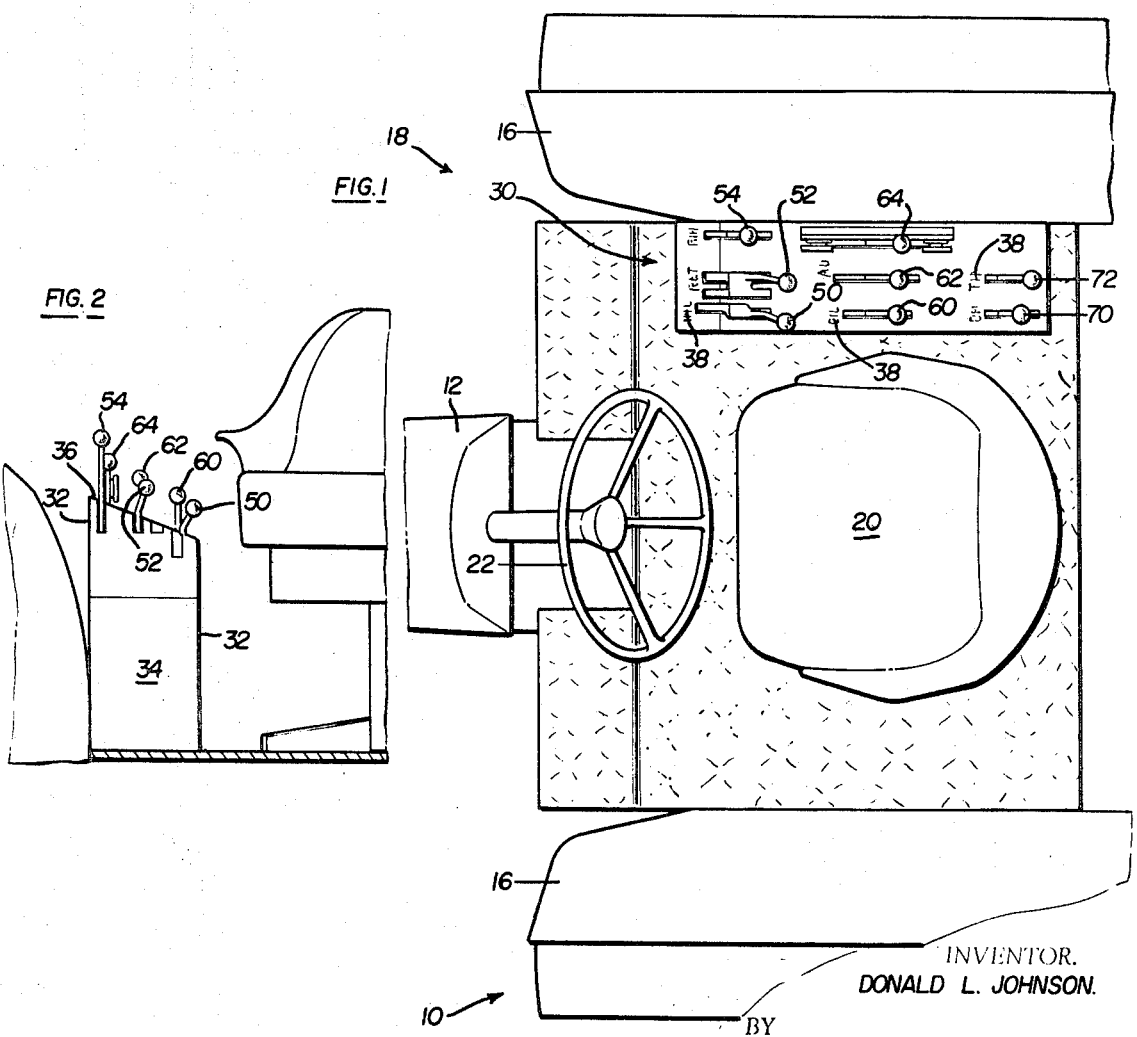
FIG. 2
FIG. 1
INVENTOR.
DONALD L. JOHNSON.
BY
SETTLE, BATCHELDER & OLTMAN.
ATT'YS.

CONTROL CONSOLE FOR VEHICLE

BACKGROUND OF THE INVENTION

The present invention relates generally to transport vehicles of the agricultural type and more particularly to an improved control console for an agricultural vehicle.

In order to meet the demands and desires of vehicle operators present day agricultural vehicles, such as tractors, are constantly being redesigned for greater versatility as well as automation which is presently highly desirable in all such vehicles.

Thus, present day agricultural tractors have incorporated therein multispeed, multirange transmissions to allow for as many as 16 forward speed and four reverse speed gear ratios. Furthermore, most larger agricultural tractors also incorporate a draft control system which allows for automatic draft control, position control and manual draft control. Various other control units are also incorporated into present day commercial agricultural vehicles such as control mechanisms for operating remote cylinders located on the implement attached to the vehicle.

Of course, each of the various mechanisms mentioned hereinabove requires various control levers which necessarily must be located conveniently with respect to the operator of the vehicle. While the industry is continually striving for a compact and asthetic operator's compartment of a commercial agricultural implement, one area which has been left virtually unattended is the location of the various control levers for the various control devices of a tractor. Thus, many present day agricultural implements will have the transmission controls located at one place, the draft control mechanisms located at another less accessible place and various other control devices scattered throughout the operator's station of the vehicle. This not only detracts from the appearance of the vehicle, but also is annoying to the operator since he must continually switch hands from the steering mechanism of the vehicle and search for the proper control lever to operate the various controlled devices.

SUMMARY OF THE INVENTION

The present invention alleviates all of the short comings mentioned hereinabove by a unitary control console having all of the control levers of an agricultural vehicle incorporated into a single unit. The entire unit or control console is located in a readily accessible space adjacent the side of the operator and has a top wall angularly inclined with respect to the operator's seat of the vehicle to place the upper surface in a plane substantially perpendicular to the line of sight of an operator disposed in the seat. Furthermore, the various control levers are designed and located so that only a single control lever of any particular group will be contacted by an operator moving his hand along a natural path from the operator's seat.

Thus, the primary object of the present invention is to provide an improved control console readily accessible and conveniently located for an operator of a vehicle.

A further object of the present invention is to provide an improved control console having various groups of control levers specifically designed and located so that all control levers are readily accessible to the operator of the vehicle.

A still further object is to provide a control console having an upper inclined surface disposed perpendicular to the line of sight of a vehicle operator and having control levers terminating in a plane angularly inclined with respect to the transverse axis of the vehicle.

Other objects of this invention will appear in the following description and appended claims, reference being had to the accompanying drawings forming a part of this specification wherein like reference characters designate corresponding parts in the several views.

BRIEF DESCRIPTION OF DRAWINGS

FIG. 1 is a plan view of the operator's compartment of a conventional agricultural vehicle;

FIG. 2 is a transverse vertical section of a portion of the operator's compartment shown in FIG. 1; and FIG. 3 is a vertical longitudinal section of the operator's compartment shown in FIG. 1.

DETAILED DESCRIPTION

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation. For example, while the invention is shown in connection with a tractor it is equally applicable to other vehicles, such as a self-propelled combine.

FIG. 1 of the drawing discloses a transport vehicle 10, such as a tractor, having a longitudinally extending body portion 12 defining a longitudinal axis for the vehicle and a transversely extending axle 14 defining a transverse axis of the vehicle with ground supporting wheels (not shown) supported on opposite ends of the axle. Adjacent opposite ends of axle 14 defining the transverse axis of the vehicle, the body is provided with fenders or guard means 16 to separate the wheels from the operator's station 18 disposed intermediate the opposite ends of the axle. The operator's station has the conventional operator's seat 20 disposed at substantially the intersection of the longitudinal and transverse axis of the vehicle with a steering wheel 22 located just forwardly of the seat within the operator's compartment 18. Various control devices such as the conventional brake pedals, clutch, gages, etc. have not been shown since they form no part of the present invention.

As was indicated above, present day agricultural vehicles of the self-propelled type require various types of control levers for operating control devices associated with the many mechanisms which have become necessary as part of a present day commercial agricultural vehicle.

According to the present invention, all of the control levers for operating the various control mechanisms are conveniently located substantially along the transverse axis of the vehicle and offset from the longitudinal axis thereof while being readily accessible to the operator normally seated in the operator's compartment 18. Thus, the control console 30 of the present invention is located adjacent the right hand fender and just slightly spaced from the right side of the seat 20 so that a right handed operator will have all of the control levers readily accessible and at one convenient location. The control console 30 includes sidewalls 32, and end walls 34 and a top wall 36. The flat top wall 36 is angularly inclined and has an upper surface extending upwardly and outwardly away from the operator's seat with the surface being disposed at an angle with respect to the transverse axis defined by the axle 14. It is readily apparent, that by locating the upper surface of the top wall 36 at an acute angle with respect to the transverse axis of the vehicle, the operator disposed in the seat 20 will be viewing the surface along a line which extends substantially perpendicular to the surface defined by the upper flat wall 36. Thus, the operator can readily read any indicia such as indicia 38 disposed on the upper surface of the console.

According to a further aspect of the present invention, the control levers supported in the control console are arranged in groups with each group of control levers carried on a single shaft and successive levers on each shaft being of increased length to provide a staggering of the free ends of the levers with respect to the transverse axis of the vehicle. In the illustrated embodiment, three groups of levers are respectively mounted on shafts 40, 42 and 44. The first group of levers supported by shaft 40 includes levers 50, 52 and 54, each of which extends through a slot defined in the upper surface of the control console with a free end disposed above the top wall. It will be noted from an inspection of FIG. 2, that the length of the control levers progressively increases along the transverse axis of the vehicle away from the seat or operator's compartment of the vehicle.

The second shaft 42 likewise supports three control levers 60, 62 and 64 which are again of progressively increasing length to stagger the free ends of the respective levers along an inclined plane with respect to the transverse axis of the vehicle.

The third group of levers are illustratively shown as including two levers 70 and 72 carried by shaft 44 with the length of lever 72 being slightly greater than that of the lever 70.

An inspection of FIG. 2 shows that all of the control levers terminate in a plane substantially parallel to the upper surface of the control console and spaced above the surface of the control console. Thus, an operator moving his hand along the transverse axis and above the surface of the control console, which is the normal movement by the operator, would only engage a single control lever of each group and greatly decrease the possibility of inadvertently grasping the wrong control lever. Thus, with only a limited amount of experience with a particular vehicle, the operator can become well acquainted with the location of all of the control levers and should be able to grasp any desired lever with a single hand while at all times keeping a the remaining hand on the steering wheel of the vehicle. This particular feature is of extreme importance in producing a control console which is readily acceptable to the industry.

It is readily apparent that the control console of the present invention provides a compact unit for housing a plurality of control levers all located at a convenient accessible place to the operator of a vehicle with each of the control levers readily accessible to the operator by merely moving his hand along horizontal planes at different heights of the transverse axis of the vehicle.

I claim:

1. In combination with a vehicle having a longitudinal body portion and a transversely extending axle supporting said body portion with said body portion having an operator's station including a seat and steering means disposed forwardly of the seat, a control console for housing a plurality of control levers for said vehicle, the improvement of said control console including a housing in generally transverse alignment with said seat and having an upper element upwardly inclined with respect to said axle to locate an upper surface of said console substantially perpendicular to the line of sight of an operator in said seat, and wherein said control console supports at least two control levers respectively mounted for pivotal movement on a single shaft with free ends of said levers extending above said upper surface, the further improvement of said levers each having differing lengths to have the free ends terminate in a plane substantially parallel to said upper surface whereby movement of an operator's hand at a selected level and substantially parallel to said axle will insure engagement of the selected control lever.

2. The combination as defined in claim 1 wherein said control console includes a pair of shafts in said housing and extending substantially parallel to said axle with at least two control levers supported on each shaft and having free ends terminating above said upper surface, the further improvement of successive control levers on each shaft being of greater length than the adjacent lever whereby said free ends terminate in a plane substantially parallel to and spaced above said upper surface.

3. The combination as defined in claim 1 wherein said control console includes a pair of longitudinally spaced shafts supported in said housing and extending substantially parallel to said axle with three control levers supported on each shaft, the further improvement of each of said levers having a free end with successive levers outwardly of said seat having an increasing length to stagger the free ends above said surface such as to locate said free ends in a plane substantially parallel to said surface.

4. In a vehicle having an operator's compartment including a substantially horizontally extending floor with an operator's seat disposed above said floor and between side edges of the floor; the combination of a control console in transverse alignment with said seat and having sidewalls and a flat top wall with said top wall being angularly inclined with respect to said floor to define an upper surface on said top wall which is substantially perpendicular to the line of sight of an operator on said seat; a plurality of longitudinally spaced operating shafts extending horizontally and laterally between said sidewalls of said console; a plurality of control levers supported on and for operating each shaft and extending through said top wall, said levers on and for each shaft progressively increasing in length to define free ends above said upper surface located in different horizontal planes progressively staggered at increasing height levels from said seat towards the outside of said vehicle; such that no two of said free ends of said levers are disposed in the same horizontal plane; to insure correct selection of any one of said plurality of levers required at a given time in the operation of said vehicle.